United States Patent
Thompson (10) Patent No.: US 9,780,564 B2
(45) Date of Patent: Oct. 3, 2017

(54) DUAL-INPUT INVERTER AND METHOD OF CONTROLLING SAME

(71) Applicant: Eaton Corporation, Cleveland, OH (US)

(72) Inventor: Christopher Scott Thompson, Kingston, RI (US)

(73) Assignee: Eaton Corporation, Cleveland, OH (US)

( * ) Notice: Subject to any disclaimer, the term of this patent is extended or adjusted under 35 U.S.C. 154(b) by 1099 days.

(21) Appl. No.: 13/630,465

(22) Filed: Sep. 28, 2012

(65) Prior Publication Data

US 2014/0091628 A1  Apr. 3, 2014

(51) Int. Cl.
*H02J 7/35* (2006.01)
*H02J 3/32* (2006.01)
(Continued)

(52) U.S. Cl.
CPC ............ *H02J 3/32* (2013.01); *H02J 3/385* (2013.01); *H02J 3/387* (2013.01); *H02J 3/46* (2013.01);
(Continued)

(58) Field of Classification Search
USPC .................... 307/9.1, 10.1, 29, 43, 66, 87
See application file for complete search history.

(56) References Cited

U.S. PATENT DOCUMENTS

| 5,473,528 | A | 12/1995 | Hirata et al. |
| 7,612,466 | B2 * | 11/2009 | Skutt .................. B60L 11/1842 307/29 |

(Continued)

FOREIGN PATENT DOCUMENTS

| CN | 101409449 A | 11/2008 |
| CN | 101599721 A | 7/2009 |

(Continued)

OTHER PUBLICATIONS

Lu et al., "Photovoltaic-Battery-Powered DC Bus System for Common Portable Electronic Devices," IEEE Transactions on Power Electronics, vol. 24, No. 3, Mar. 2009, pp. 849-855.

(Continued)

*Primary Examiner* — Rexford Barnie
*Assistant Examiner* — Xuan Ly
(74) *Attorney, Agent, or Firm* — Ziolkowski Patent Solutions Group, SC (57) ABSTRACT

A system and method for controlling a voltage from both a PV array and a battery source received by a common PV inverter includes a PV module configured to generate a DC output from received solar irradiation and a DC storage device configured to supply a DC output. The system further includes a power inverter configured to invert the DC output from the PV module and the DC output from the DC storage device to an AC output. The power inverter includes a first input electrically coupled to the PV module to receive the DC output therefrom; and a second input electrically coupled to the DC storage device to receive the DC output therefrom. The system further includes a controller configured to selectively control the inversion of the DC output from the PV module and selectively control the inversion of the DC output from the DC storage device.

23 Claims, 4 Drawing Sheets

(51) Int. Cl.
H02J 3/38 (2006.01)
H02J 3/46 (2006.01)

(52) U.S. Cl.
CPC ............... *H02J 7/35* (2013.01); *Y02E 10/566* (2013.01); *Y02E 10/58* (2013.01); *Y02E 70/30* (2013.01); *Y10T 307/625* (2015.04)

(56) References Cited

U.S. PATENT DOCUMENTS

| | | | |
|---|---|---|---|
| 2006/0017327 A1 | 1/2006 | Siri et al. | |
| 2009/0212629 A1 | 8/2009 | Paull | |
| 2010/0141041 A1 | 6/2010 | Bose et al. | |
| 2010/0207454 A1 | 8/2010 | Jagota et al. | |
| 2011/0103114 A1 | 5/2011 | Huang et al. | |
| 2011/0215640 A1* | 9/2011 | Donnelly | H02J 1/10 307/21 |
| 2011/0291479 A1* | 12/2011 | Lee | H02J 3/32 307/43 |
| 2011/0298288 A1* | 12/2011 | Cho | H01M 10/465 307/70 |
| 2013/0049695 A1* | 2/2013 | Baba | H02J 3/32 320/128 |
| 2014/0062206 A1* | 3/2014 | Bryson | H02J 3/385 307/80 |

FOREIGN PATENT DOCUMENTS

| | | |
|---|---|---|
| CN | 201590672 U | 9/2010 |
| CN | 101969281 A | 2/2011 |
| DE | 3611544 A1 | 4/1986 |
| DE | 19545655 A1 | 12/1995 |
| DE | 202006008818 U1 | 6/2006 |
| JP | 56088676 A | 12/1979 |
| JP | 2011517846 A | 2/2008 |
| JP | 4568482 B2 | 10/2010 |
| RU | 2156534 C2 | 12/1998 |
| RU | 2211480 C2 | 4/2001 |
| RU | 2395148 C1 | 3/2009 |

OTHER PUBLICATIONS

Koutroulis et al., "Methodology for optimal sizing of stand-alone photovoltaic/wind-generator systems using genetic algorithms," Science Direct, Solar Energy 80, 2006, pp. 1072-1088.

"Modeling of the studied hybrid power generator," http://tel.archives-ouvertes.fr/docs/00/58/63/93/PDF/Lu_Di_DLE.pdf.

Koutroulis et al., "Design optimization of desalination systems power-supplied by PV and W/G energy sources," Elsevier B.V., 2010, pp. 171-181.

Radziemska et al., "Photovoltaic Maximum Power Point Varying with Illumination and Temperature," Journal of Solar Energy Engineering, Transactions of the ASME, Feb. 2006, vol. 128, pp. 34-39.

\* cited by examiner

FIG. 4

DUAL-INPUT INVERTER AND METHOD OF CONTROLLING SAME

BACKGROUND OF THE INVENTION

Embodiments of the invention relate generally to electronic power conversion and, more particularly, to a dual-input inverter topology and method of controlling thereof that allows for the output of two DC sources to be combined in the same inverter.

Photovoltaic (PV) power systems are power systems that employ a plurality of solar modules to convert sunlight into electricity. PV systems include multiple components, including photovoltaic modules, mechanical and electrical connections and mountings, and means of regulating or modifying the electrical output. One common arrangement in PV systems is for several PV modules to be connected in series to form a PV string, with multiple PV strings in a PV system then being combined in parallel to aggregate the current in a PV array. Photovoltaic (PV) cells generate direct current (DC) power, with the level of DC current being dependent on solar irradiation and the level of DC voltage dependent on temperature. When alternating current (AC) power is desired, an inverter is used to convert the DC energy into AC energy, such as AC energy suitable for transfer to a power grid.

For converting the varying DC voltage of a PV array to the fixed frequency AC voltage of the power grid, PV inverters may employ either a single-stage conversion power circuit in which a transformer is employed to boost the AC voltage or a two-stage conversion power circuit that uses a DC link as an intermediate energy storage step, which means that the converter first converts the unstable PV array voltage to a stable DC voltage. The PV inverter then subsequently converts the stable voltage into an AC current that can be injected into the grid. In a two-stage PV inverter, often the first stage includes a boost converter, and the second stage includes a single-phase or three-phase inverter system.

Currently, there is a desire to add battery storage to solar plants. Battery storage allows for a number of features that enhance grid operation and enable higher penetration of solar power. However, known systems that incorporate battery storage in solar plants utilize separate inverters for the batteries and solar modules as sharing of DC power of the batteries and solar modules is not possible in a common inverter due to the mismatch of operating voltage between the batteries and solar modules. The use of separate inverters adds to the overall cost of the photovoltaic system and may affect system reliability.

It would therefore be desirable to provide a photovoltaic system capable of combining the DC power of the batteries and solar modules in the same inverter.

BRIEF DESCRIPTION OF THE INVENTION

The present invention provides a system and method for controlling the DC voltage provided to a dual source inverter by a battery source and photovoltaic array. A control strategy is set forth that provides for dynamic regulation of the operating voltage of the battery source and/or photovoltaic array such that the DC power of the battery source and photovoltaic array may be combined and share the same inverter.

In accordance with one aspect of the invention, a photovoltaic (PV) system includes a PV module configured to generate a DC output from received solar irradiation and a direct current (DC) storage device configured to supply a DC output. The system further includes a power inverter configured to invert the DC output from the PV module and the DC output from the DC storage device to an alternating current (AC) output. The power inverter includes a first input electrically coupled to the PV module to receive the DC output therefrom; and a second input electrically coupled to the DC storage device to receive the DC output therefrom. The system further includes a controller configured to selectively control the inversion of the DC output from the PV module and selectively control the inversion of the DC output from the DC storage device.

In accordance with another aspect of the invention, a method of controlling a photovoltaic (PV) system includes measuring a DC voltage output from a PV array to a first input of a dual-input inverter and measuring a DC operating voltage of a battery source selectively coupleable to the dual-input inverter. The method further includes comparing the measured DC voltage output from the PV array to the measured DC operating voltage of the battery source and controlling switching of at least one switching device of the dual-input inverter based on the comparison of the measured DC voltage output from the PV array to the measured DC operating voltage of the battery source.

In accordance with yet another aspect of the invention, a photovoltaic (PV) system includes an inverter configured to invert a direct current (DC) power to an alternating current (AC) power for delivery to a power grid. The inverter includes a first input electrically coupled to a PV array comprising at least one PV module, the first input configured to receive DC voltage output generated by the PV array in response to received solar irradiation. The inverter also includes a second input electrically coupled to a battery, the second input configured to receive DC voltage output from the battery. The PV system also includes a controller programmed to selectively control switching of the inverter.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENTS

The embodiments of the invention set forth herein relate to a system and method for controlling a voltage from both a PV array and a battery source received by a common PV inverter. A PV system is provided that includes one or more PV arrays configured to generate a direct current (DC) output and a secondary DC source, such as, for example, one or more batteries. A dual-input DC-to-AC power inverter is electrically coupled to the PV array(s) and battery source to receive the DC output therefrom and invert the DC output to an AC output. A controller is provided to sense an output voltage of the PV array(s) and battery source and selectively adjust the effective operating voltage of the PV array(s) to match that of the battery source. Switching devices are positioned between the PV array, battery source, and the DC-to-AC power inverter to selectively connect the PV array and battery source to the DC-to-AC power inverter.

Figure 1:
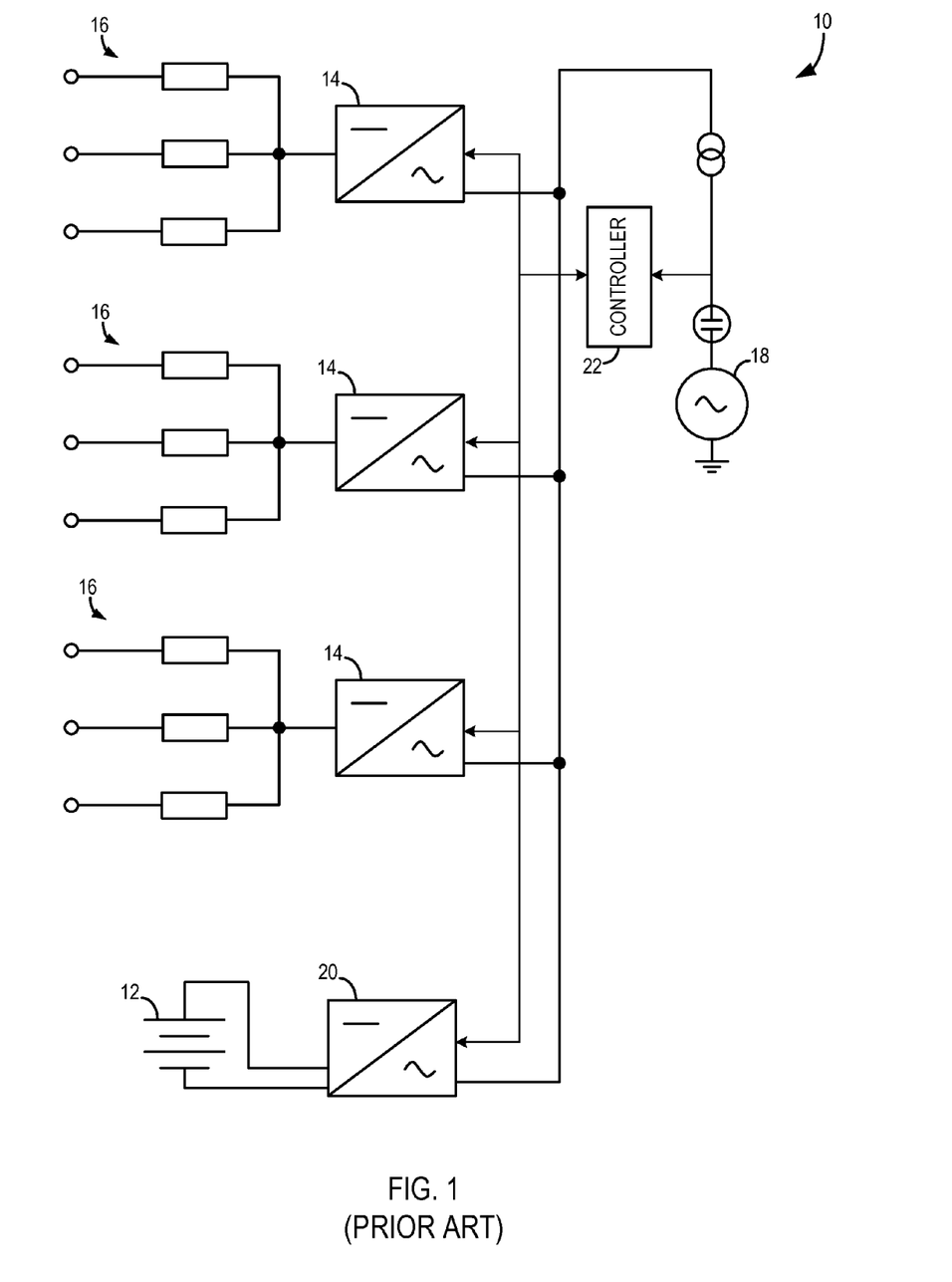
FIG. 1 is a schematic illustration of a photovoltaic inverter system that is known in the prior art.

The general structure of a photovoltaic (PV) system 10 including a battery 12 that is known in the art is shown in FIG. 1. System 10 includes a number of PV inverters 14 coupled to respective PV arrays 16 to convert a varying DC voltage from the PV arrays 16 to a fixed frequency AC current for a power grid 18. A separate inverter 20 is coupled to battery 12 to convert the DC voltage output from battery 12 to a fixed frequency AC current to supply to power grid 18. In such an arrangement battery 12 functions as a secondary power source for power grid 18. A controller 22 functions to control switching of the plurality of switches in the PV inverters 14 and battery inverter 20 in order to output a desired AC power to power grid 18. Because battery 12 and PV arrays 16 do not operate at the same operating voltage, direct sharing of DC power between battery 12 and PV arrays 16 is not possible.

Figure 2:
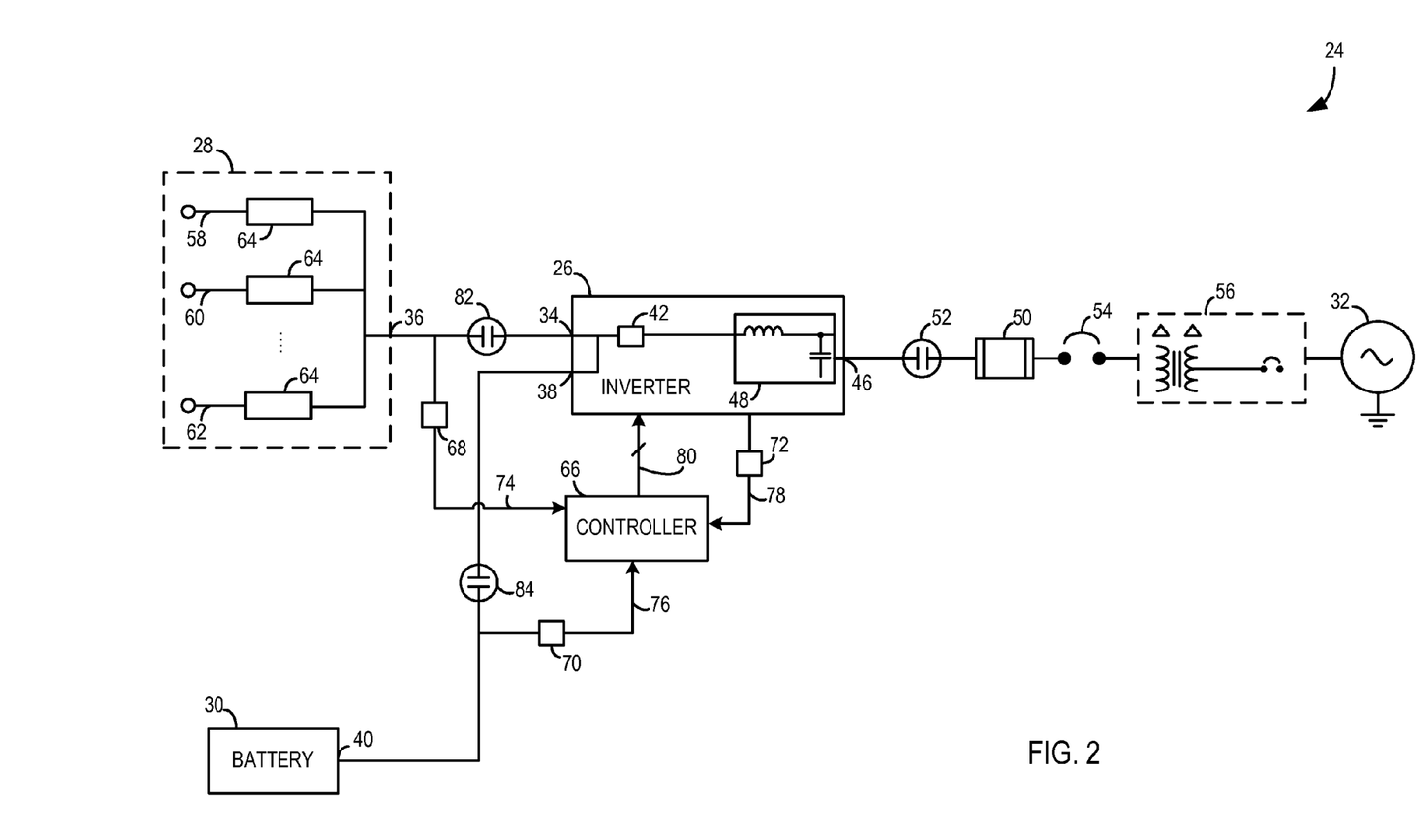
FIG. 2 is a schematic illustration of a dual DC source inverter system according to an embodiment of the invention.

Referring now to FIG. 2, a dual DC source system 24 is shown according to an embodiment of the invention. Dual DC source system 24 employs a dual-input inverter 26 (e.g., a DC-to-AC power inverter) to convert a DC voltage output received from a PV array assembly 28 and a DC voltage output received from a DC source or DC storage device 30 to a fixed frequency AC current for a power grid 32. In the exemplary embodiments described herein, DC storage device 30 is a DC battery source. However, one skilled in the art will recognize that DC storage device 30 may be configured as a fuel cell, ultra capacitor, or other known type of DC source.

PV inverter 26 includes a first input 34 that is electrically coupled to an output 36 of PV array assembly 28 and a second input 38 that is electrically coupled to an output 40 of battery source 30 to receive a DC voltage therefrom. PV inverter 26 also includes a set of switches 42 that convert the DC power output of the PV array assembly 28 and/or battery 30 to an AC power, a filter 48, and an output 46 to transfer the combined AC power of the PV array assembly 28 and the battery source 30 to a load, such as power grid 32. According to various embodiments of the invention, system 24 may also include any number of additional components such as, for example, a filter 48, a fuse 50, a contactor 52, a circuit breaker 54, and a transformer 56 coupled between inverter 26 and power grid 32.

As shown in FIG. 2, PV array assembly 28 may include any number of PV array groups (e.g., first PV array group 58, second PV array group 60, third PV array group 62, etc.), with each PV array group 58, 60, 62 being configured to generate a DC power responsive to received solar irradiation. Each PV array group 58, 60, 62 includes one or more PV arrays 64, with each of the PV arrays 64 including a plurality of modules/cells therein. According to one embodiment, each PV array 64 includes a plurality of PV strings, with each PV string being having a plurality of PV modules that are connected in series. One skilled in the art will recognize that the number of PV arrays and the number of PV strings and PV modules therein can vary, with one, two, three, or four or more PV arrays being included in each PV array group groups 58, 60, 62, for example. Alternatively, PV array assembly 28 may be a single PV module. DC source 30 may be a single battery, multiple batteries coupled together as a battery bank, or an alternative form of DC energy source, according to various embodiments.

As shown in FIG. 2, the output 36 of PV array assembly 28 is electrically coupled to switches 42 of PV inverter 26. One skilled in the art will recognize that switches 42 may be in the form of any of a number of various switching elements or devices, including a relay, an IGBT, an SCR, a circuit breaker, sub-arrays of small contactors, or other suitable switching devices. In operation, switches 42 function to selectively regulate the effective operating voltage corresponding to output 36 of PV array assembly 28 to the PV inverter 26, as described in more detail below.

To control actuation/switching of switches 42 and the corresponding amount/level of voltage provided from the PV array assembly 28 to the PV inverter 26, a controller 66 is provided in dual DC source system 24 that is operationally coupled to the switches 42. According to embodiments of the invention, controller 66 may be in the form of a separate dedicated controller or as forming part of the existing inverter controller that controls functions of PV inverter 26 along with the controlling of switches 42.

Dual DC source system 24 also includes a first set of sensors 68, a second set of sensors 70, and a third set of sensors 72, which are provided to monitor the voltage and/or current at the output 36 of PV array assembly 28, the output 40 of the energy storage unit 30, and the output 46 of inverter 26, respectively. Sensors 68, 70, 72 may be wired or wireless sensors that transmit respective real-time voltage signals and real-time current signals 74, 76, 78 corresponding to PV array assembly 28, battery source 30, and inverter 26 to controller 66. Based on one or more of the received signals 74, 76, 78, controller 66 transmits a series of switching signals or switching commands 80 to the switches 42 of inverter 26, as described in detail below.

A first contactor 82 is provided between the output 36 of PV array assembly 28 and the input 34 of inverter 26 to selectively connect and disconnect the output 36 of PV array assembly 28 to power grid 32. Likewise, a second contactor 84 is coupled between the output 40 of battery source 30 and the input 38 of inverter 26 to selectively connect and disconnect the output 40 of battery source 30 to power grid 32. First and second contactors 82, 84 may be configured as mechanical or solid-state type switching devices, such as, for example, circuit breakers, relays, or other known devices.

Controller 66 is programmed to control dual DC source system 24 to operate in one of several modes of operation, including a photovoltaic-only mode, a battery-only mode, a recharge mode, and a dual source mode, as described in detail below. One skilled in the art will recognize that these modes of operation may be modified and customized in any number of ways based on application- and customer-specific situations.

When operating in photovoltaic-only mode, second contactor 84 is in an open position, thus battery source 30 is disconnected from power grid 32. First contactor 82 is in a closed position to connect the output of dual DC source system 24 to power grid 32. Controller 66 is programmed to implement a maximum power point tracking (MPPT) algorithm that causes controller 66 to selectively control switching of inverter switches 42 to extract the maximum possible available power from PV array assembly 28. During MPPT, controller 66 continuously monitors the output 46 of inverter 26 via third set of sensors 72 and adjusts the switching of inverter switches 42 so as to maximize the power output to power grid 32.

When operating in battery-only mode, first contactor 82 is in an open position and second contactor 84 is in a closed position, so as to connect battery source 30 to power grid 32 and disconnect PV array assembly 28 from power grid 32. In this mode, controller 66 selectively controls switching of switches 42 to regulate the DC voltage output from battery source 30 to allow conversion to AC voltage to the power grid 32.

In recharge mode, first contactor 82 is in an open position, and second contactor 84 is in a closed position similar to battery-only mode. Controller 66 selectively controls inverter 26 to operate in a reverse direction to charge battery source 30 from power grid 32.

In dual-source mode, first and second contactors 82, 84 are closed to couple the voltage outputs of PV array assembly 28 and battery source 30 to power grid 32. In order to allow inverter 26 to combine the outputs of PV array assembly 28 and battery source 30, the operating voltage of PV array assembly 28 is matched to the operating voltage of battery source 30. Thus, in dual-source mode, controller 66 continuously monitors the voltage and/or current signals 72, 74 from PV output 36 and battery output 40 received from sensors 68, 70 to determine a measured operating voltage of both PV array assembly 28 and battery source 30. Based on a comparison of the measured operating voltages of PV array assembly 28 and battery source 30, inverter 26 selectively controls the switching of switches 42 or so that the effective operating voltages of PV array assembly 28 and battery source 30 match.

If, for example, controller 66 determines that the measured operating voltage of battery source 30 is greater than the measured operating voltage of PV array assembly 28, controller 66 selectively operates switches 42 to regulate the output 36 of the PV array assembly 28 to temporarily increase its effective voltage so that the effective operating voltage of PV array assembly 28 matches the measured operating voltage of the battery source 30. If, on the other hand, controller 66 determines that the measured operating voltage of PV array assembly 28 is greater than the measured operating voltage of battery source 30, controller 66 temporarily moves the voltage operating point of inverter 26 down operating switches 42 to regulate the effective operating voltage of PV array assembly 28 so as to match the measured operating voltage of battery source 30 measured by second set of sensors 70.

Figure 3:
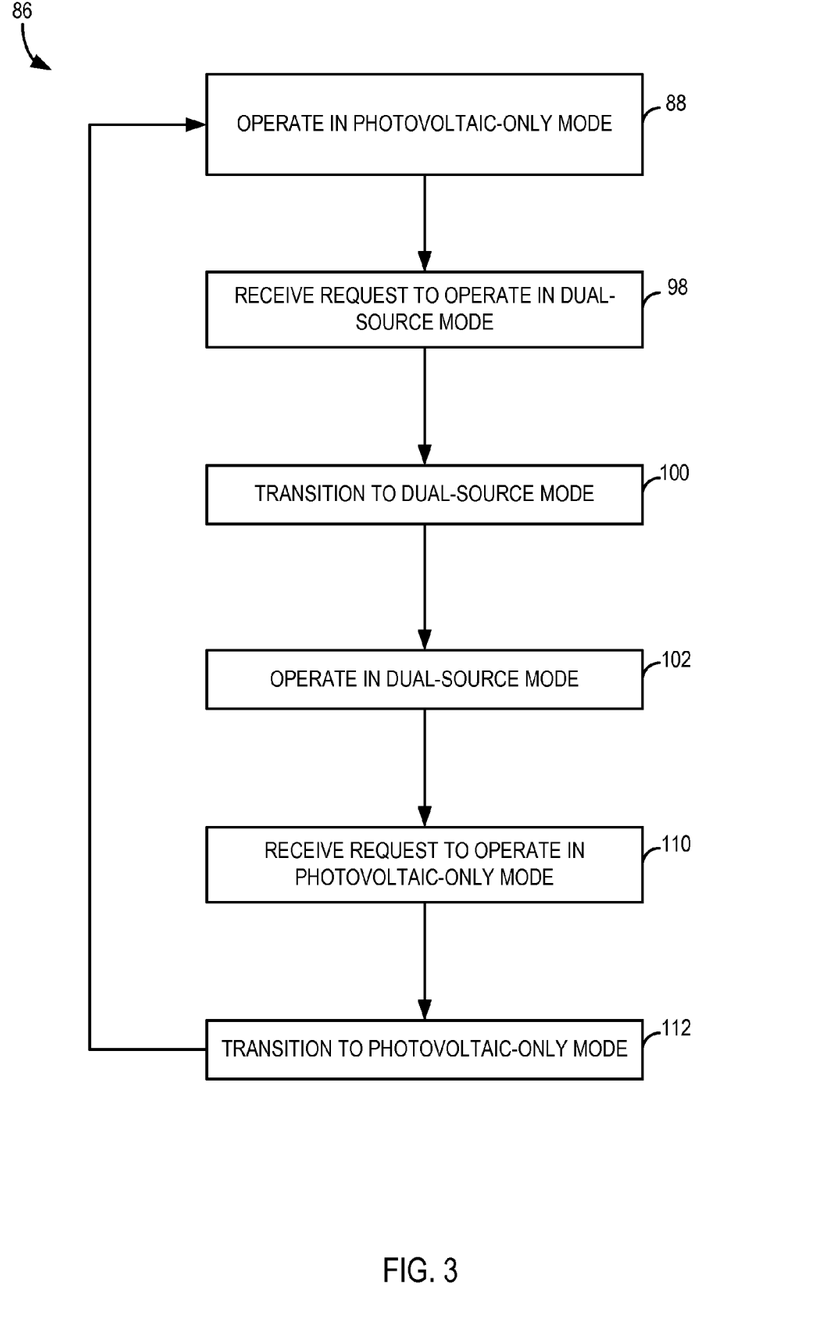
FIG. 3 is a flowchart illustrating a technique for controlling DC voltage to the inverter of FIG. 2 according to an embodiment of the invention.
Figure 4:
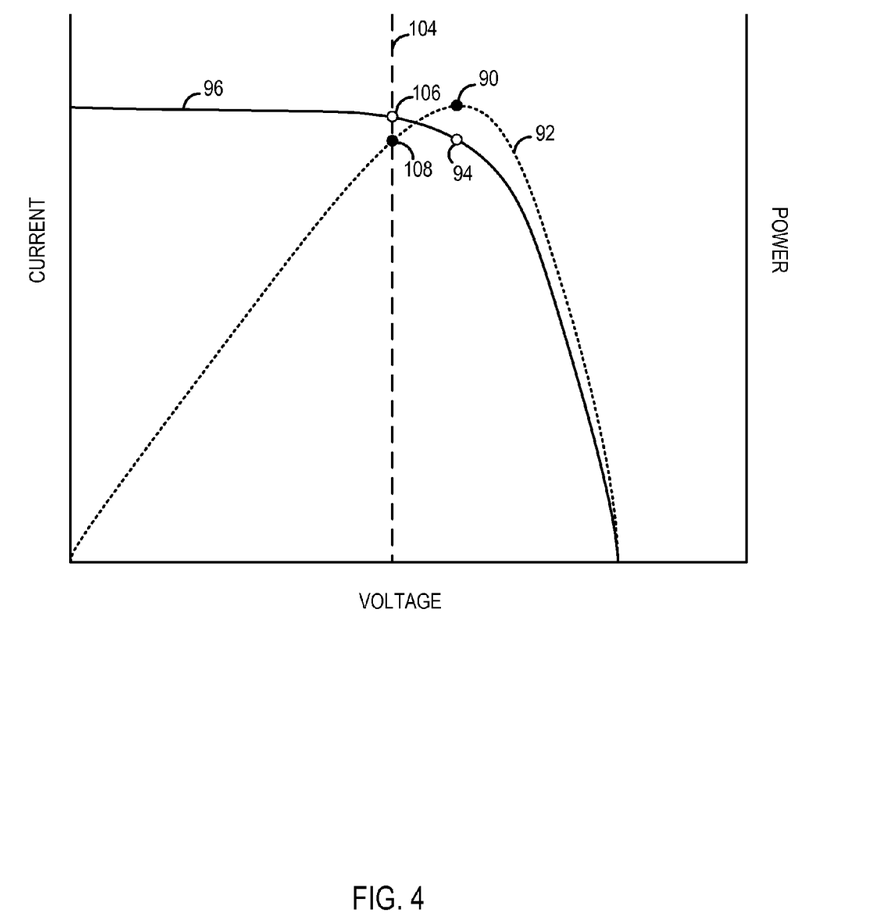
FIG. 4 is a graph illustrating the operating voltage and output power of a photovoltaic system controlled according to the technique set forth in FIG. 3.

Referring now to FIGS. 3 and 4, and with continued reference to FIG. 2, a technique 86 for controlling the DC voltage provided to inverter 26 is illustrated according to an embodiment of the invention. Technique 86 is performed by a controller (e.g., controller 66) or similar control device, according to embodiments of the invention, to provide dynamic control of DC voltage provided from PV array assembly 28 and battery source 30 to inverter 26. In particular, technique 86 illustrates an operating scenario wherein controller 66 initially operates dual DC source system 24 in photovoltaic-only mode, determines that battery support is desired, transitions system 24 from initial operation in photovoltaic-only mode into operation in dual-source mode, determines that battery support is no longer desired, and finally transitions system 24 back into photovoltaic-only mode.

Technique 86 begins at STEP 88 with dual DC source system 24 operating in photovoltaic-only mode. As described above, when operating in photovoltaic-only mode, system 24 is controlled according to an MPPT algorithm. Thus, PV array assembly 28 is initially operating at its maximum power point 90 on power curve 92 of PV array assembly 28, as shown in FIG. 4. Operation at maximum power point 90 corresponds to an array output current corresponding to point 94 on the output current curve 96 of PV array assembly 28. While operating in photovoltaic-only mode at point 90, first contactor 82 is closed and second contactor 84 is open. Controller 66 continuously monitors the DC voltage generated by and output from the PV array assembly 28 as well as the output from inverter 26 and selectively controls switching of inverter switches 42 according to the MPPT algorithm.

At STEP 98, controller 66 receives a request to operate in dual-source mode. Based on the request, controller 66 transitions photovoltaic system 24 to dual-source mode at STEP 100. Controller 66 begins monitoring the output of battery source 30, the output of PV array assembly 28, and the output of inverter 26 via signals 72, 74, 78 received from sensors 68, 70, 72.

The measured DC voltage of PV array assembly 28 and battery source 30 are compared at STEP 102. Based on the comparison of the measured DC voltage of PV array assembly 28 and battery source 30, a control strategy for switching the switches 42 determined. As set forth in detail above, the switching of switches 42 controls the effective voltage provided from PV array assembly to match that of the battery source 30 to common PV inverter 26. Once the effective voltage from PV array assembly 28 matches that of battery source 30, second contactor 84 is closed to connect the output of battery source 30 to inverter 26.

In an embodiment where controller 66 determines that the measured operating voltage of battery source 30 is less than the operating voltage of PV array assembly 28, such as a battery operating voltage 104 of FIG. 4, the voltage operating point of PV array assembly 28 is reduced to point 106 to match operating voltage 104 of battery source 30. Adjusting the effective operating voltage of PV array assembly 28 moves the array assembly 28 off of its maximum power point 90. However, as can be seen in FIG. 4, the output power of PV array assembly 28 at point 108 may only be reduced slightly from the output power at maximum power point 90.

Dual DC source system 24 continues operating in dual-source mode until receiving a request to operate in photovoltaic-only mode at STEP 110. At STEP 112, controller 66 transitions system 24 to operate in photovoltaic-only mode, and second contactor 84 is closed. The operating voltage of PV array assembly 28 increases from point 106 to point 94 as PV array assembly 28 returns to operating at its maximum power point 90. Technique 86 returns to STEP 88 and operates in photovoltaic-only mode as described above.

While technique 86 is described above to effect a transition between photovoltaic-only mode and dual source mode, one skilled in the art will readily recognize that technique 86 may be readily adapted to transition between any desired modes of operation. The transition between modes may be requested in real time by an operator or preprogrammed on controller to occur based on a sensed operating characteristic, time of day, etc. For example, the technique may transition to a recharge mode at night to recharge the battery source to take advantage of less expensive energy rates. Also, the technique may transition from dual source mode to photovoltaic-only mode when the monitored operating voltage of battery source falls below a predetermined threshold. In a similar manner, the technique may transition from photovoltaic-only mode to battery-only mode when the operating voltage of PV array assembly 28 falls below a predetermined threshold.

Beneficially, the dual DC source system 24 of FIG. 2 and the associated technique 86 of FIG. 3 provide for the dynamic control of the output voltage of PV array assembly 28 and the output voltage of battery source 30 such that a combined battery and PV system may be configured with a single inverter, which beneficially reduces the number of electronic components in dual DC source system 24, and makes system 24 less expensive and more reliable.

A technical contribution for the disclosed method and apparatus is that it provides for a controller implemented technique for controlling a dual-input inverter coupled to a PV module and a DC storage device.

Therefore, according to one embodiment of the present invention, a photovoltaic (PV) system includes a PV module configured to generate a DC output from received solar irradiation and a direct current (DC) storage device configured to supply a DC output. The system further includes a power inverter configured to invert the DC output from the PV module and the DC output from the DC storage device to an alternating current (AC) output. The power inverter includes a first input electrically coupled to the PV module to receive the DC output therefrom; and a second input electrically coupled to the DC storage device to receive the DC output therefrom. The system further includes a controller configured to selectively control the inversion of the DC output from the PV module and selectively control the inversion of the DC output from the DC storage device.

According to another embodiment of present invention, a method of controlling a photovoltaic (PV) system includes measuring a DC voltage output from a PV array to a first input of a dual-input inverter and measuring a DC operating voltage of a battery source selectively coupleable to the dual-input inverter. The method further includes comparing the measured DC voltage output from the PV array to the measured DC operating voltage of the battery source and controlling switching of at least one switching device of the dual-input inverter based on the comparison of the measured DC voltage output from the PV array to the measured DC operating voltage of the battery source.

According to yet another embodiment of the present invention, a photovoltaic (PV) system includes an inverter configured to invert a direct current (DC) power to an alternating current (AC) power for delivery to a power grid. The inverter includes a first input electrically coupled to a PV array comprising at least one PV module, the first input configured to receive DC voltage output generated by the PV array in response to received solar irradiation. The inverter also includes a second input electrically coupled to a battery, the second input configured to receive DC voltage output from the battery. The PV system also includes a controller programmed to selectively control switching of the inverter.

The present invention has been described in terms of the preferred embodiment, and it is recognized that equivalents, alternatives, and modifications, aside from those expressly stated, are possible and within the scope of the appending claims.

What is claimed is:

1. A photovoltaic (PV) system comprising:
   a PV module configured to generate a DC output from received solar irradiation;
   a direct current (DC) storage device configured to supply a DC output;
   a power inverter configured to invert the DC output from the PV module and the DC output from the DC storage device to an alternating current (AC) output, the power inverter comprising:
   a first input electrically coupled to the PV module to receive the DC output therefrom; and
   a second input electrically coupled to the DC storage device to receive the DC output therefrom; and
   a controller configured to:
   selectively control the inversion of the DC output from the PV module such that an effective operating voltage of the PV module is substantially equal to a measured operating voltage of the DC storage device; and
   selectively control the inversion of the DC output from the DC storage device.

2. The PV system of claim 1 wherein the controller is further configured to combine the DC output from the PV module and the DC output of the DC storage device when the effective operating voltage of the PV module is substantially equal to the measured operating voltage of the DC storage device.

3. The PV system of claim 1 wherein the controller is further configured to selectively control the inversion of the DC output from the PV module to reduce the effective operating voltage of the PV module.

4. The PV system of claim 1 wherein the controller is further configured to selectively control switching of the power inverter according to a maximum power point tracking algorithm.

5. The PV system of claim 1 wherein the controller is further configured to selectively control switching of the power inverter to control a voltage operation point of the power inverter.

6. The PV system of claim 1 wherein the controller is further configured to:
   measure the DC output from the PV module;
   measure the DC output from the DC storage device;
   compare the measured DC output from the PV module to the measured DC output from the DC storage device; and
   selectively control switching of the power inverter based on the comparison of the measured DC output of the PV module and the measured DC output from the DC storage device.

7. The PV system of claim 1 further comprising:
   a first contactor positioned between the PV module and the power inverter, the first contactor being configured to selectively connect the PV module to the power inverter; and
   a second contactor positioned between the DC storage device and the power inverter, the second contactor being configured to selectively connect the DC storage device to the power inverter.

8. The PV system of claim 7 wherein the controller is further configured to:
   monitor an operating voltage of the PV module;
   monitor the operating voltage of the DC storage device;
   compare the monitored operating voltage of the PV module to the monitored operating voltage of the DC storage device; and
   if the monitored operating voltage of the DC storage device substantially matches the monitored operating voltage of the PV module, close the second contactor to connect the DC storage device to the power inverter.

9. A method of controlling a photovoltaic (PV) system, the method comprising:
   measuring a DC voltage output from a PV array to a first input of a dual-input inverter;

measuring a DC operating voltage of a battery source selectively coupleable to a second input of the dual-input inverter;

comparing the measured DC voltage output from the PV array to the measured DC operating voltage of the battery source; and controlling switching of at least one switching device of the dual-input inverter based on the comparison of the measured DC voltage output from the PV array to the measured DC operating voltage of the battery source.

10. The method of claim 9 wherein comparing the measured DC voltage output from the PV array to the measured DC voltage output from the battery source comprises:

determining if the measured DC voltage output from the PV array is greater than the measured DC voltage output from the battery source; and if the measured DC voltage output from the PV array is greater than the measured DC voltage output from the battery source, then controlling the at least one switching device to reduce an effective voltage output from the PV array to be substantially equal to the DC voltage output of the battery source.

11. The method of claim 9 wherein comparing the measured DC voltage output from the PV array to the measured DC voltage output from the battery source comprises:

determining if the measured DC voltage output from the PV array is less than the measured DC voltage output from the battery source; and if the measured DC voltage output from the PV array is less than the measured DC voltage output from the battery source, then controlling the at least one switching device to increase an effective voltage output from the PV array to be substantially equal to the DC voltage output of the battery source.

12. The method of claim 9 further comprising:

receiving a request to operate in one of a photovoltaic-only mode, a battery-only mode, a recharge mode, and a dual-source mode; and selectively controlling a first contactor positioned between the PV array and the a dual-input inverter based on the received request; and selectively controlling a second contactor positioned between the battery source and the dual-input inverter based on the received request.

13. The method of claim 12 further comprising:

electrically connecting the PV array to the dual-input inverter;

determining if an effective voltage output from the PV array electrically connected to the dual-input inverter equals the measured DC voltage output from the battery source electrically disconnected from the dual-input inverter; and if the measured DC voltage output from the PV array substantially equals the measured DC voltage output from the battery source, closing the second contactor to electrically connect the battery source to the dual-input inverter.

14. A photovoltaic (PV) system comprising:

an inverter configured to invert a direct current (DC) power to an alternating current (AC) power for delivery to a power grid, the inverter comprising:

a first input electrically coupled to a PV array comprising at least one PV module, the first input configured to receive a DC voltage output generated by the PV array in response to received solar irradiation; and a second input electrically coupled to a battery, the second input configured to receive a DC voltage output from the battery; and a controller programmed to selectively control switching of the inverter such that an effective operating voltage of the PV array matches the DC voltage output from the battery.

15. The PV system of claim 14 wherein the controller is further programmed to couple the DC voltage output from the battery to the inverter upon matching the effective operating voltage of the PV array to the DC voltage output from the battery.

16. The PV system of claim 14 wherein the controller is further programmed to selectively control switching of the inverter to operate the PV array at a maximum power point.

17. The PV system of claim 14 further comprising:

a first sensor configured to sense the DC voltage output from the PV array; and a second sensor configured to sense the DC voltage output from the battery.

18. The PV system of claim 17 wherein the controller is further programmed to:

compare the sensed DC voltage output from the PV array to the sensed DC voltage output from the battery; and selectively control switching of the inverter based on the comparison of the sensed DC voltage output from the PV array and the sensed DC voltage output from the battery.

19. The PV system of claim 14 wherein the controller is further programmed to selectively control switching of the inverter to recharge the battery from the power grid.

20. The PV system of claim 14 further comprising:

a first contactor positioned between the PV array and the inverter to selectively couple the DC voltage output from the PV array to the inverter; and a second contactor positioned between the battery and the inverter to selectively couple the DC voltage output from the battery to the inverter.

21. The PV system of claim 20 wherein the controller is further programmed to selectively control closure of the first and second contactors based on a desired mode of operation of the PV system.

22. The PV system of claim 20 wherein the controller is further programmed to close the second contactor to couple the DC voltage output from the battery to the inverter when the effective operating voltage of the PV array matches a measured operating voltage of the battery.

23. The PV system of claim 1 further comprising:

a first switching device positioned between the PV module and the power inverter and controlled by the controller to selectively connect the DC output from the PV module to the power inverter; and a second switching device positioned between the DC storage device and the power inverter and controlled by the controller to selectively connect the DC output from the DC storage device to the power inverter.

* * * * *